3,770,843
OLEFIN PREPARATION
Nathan Kornblum, West Lafayette, Ind., assignor to
Purdue Research Foundation
No Drawing. Filed Aug. 17, 1972, Ser. No. 281,576
Int. Cl. C07c 11/20
U.S. Cl. 260—677 R  4 Claims

ABSTRACT OF THE DISCLOSURE

Both symmetrical and unsymmetrical olefins are obtained by the elimination of two nitro groups from vicinal dinitro compounds. The elimination is effected by treatment of the vicinal dinitro compound with sodium, potassium, lithium or ammonium sulfide or sodium, potassium or lithium thiophenoxide in an aprotic solvent. The reaction is accelerated by light.

BACKGROUND OF THE INVENTION

This invention pertains to a method for the preparation of olefins. More particularly, this invention pertains to a process for the elimination of two nitro groups from vicinal dinitro compounds to yield olefins.

Because of the reactivity of the double bond, olefins are useful intermediates in the preparation of numerous classes of organic chemicals. For example, olefins are readily converted to the corresponding epoxides or glycols. Olefins also enter into Diels-Alder reactions to yield products containing a 6-membered ring. Further, olefins are useful monomers in the preparation of various types of polymers.

A number of methods for converting aliphatic and alicyclic nitro compounds into vicinal dinitro compounds have been described. Such methods are described, for example, by Seigle et al., J. Org. Chem. 5, 100 (1940); Pagano et al., J. Org. Chem. 35, 295 (1970); Kornblum et al., J. Amer. Chem. Soc. 92, 5783 (1970); and Kaplan et al., J. Amer. Chem. Soc. 83, 3535 (1961).

SUMMARY

I have now discovered that vicinal dinitro compounds eliminate both nitro groups to yield olefins when treated with sodium, potassium, lithium or ammonium sulfide or sodium, potassium or lithium thiophenoxide in an aprotic solvent at a temperature within the range of about 0° to about 100° C. The process is accelerated by light. Both symmetrical and unsymmetrical olefins may be obtained depending upon the vicinal dinitro starting material.

DESCRIPTION OF THE PREFERRED EMBODIMENT

The vicinal dinitro compound which is useful as a starting material for my process is one having the formula

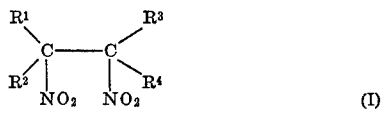

wherein each of $R^1$, $R^2$, $R^3$ and $R^4$ independently is a $C_1$–$C_8$ alkyl group or phenyl, or $R^1$ and $R^2$ together with the carbon atom to which they are atached or $R^3$ and $R^4$ together with the carbon atom to which they are attached form a $C_4$–$C_8$ cycloalkyl group. Such compounds are readily available by one or more of the processes referred to above.

Thus, each of the groups, when taken separately, may be such as methyl, ethyl, 2-ethylhexyl, butyl, isobutyl, n-hexyl or phenyl. Adjacent groups together with the carbon atom to which they are attached can be such cycloalkyl groups as cyclobutyl, cyclopentyl, cyclohexyl, cycloheptyl or cyclooctyl.

In accordance with my process, a vicinal dinitro compound of Formula I is treated with a material selected from sodium sulfide, potassium sulfide, lithium sulfide, ammonium sulfide, sodium thiophenoxide, potassium thiophenoxide or lithium thiophenoxide. Sodium sulfide is the preferred reagent. The amount of sulfide or thiophenoxide employed is within the range of from about 1 mole to about 3 moles for each mole of dinitro compound. I prefer to use from about 1½ to about 2½ moles of the sulfide or thiophenoxide per mole of dinitro compound. The sulfide may be anhydrous or in hydrate form.

The reaction is conducted in an aprotic solvent. Aprotic solvents, as a class, are well-known to those skilled in organic chemistry. Examples of such solvents include dimethylformamide, dimethylsulfoxide, hexamethylphosphoramide, diethylacetamide, N-methylpyrrolidone and acetonitrile.

The reaction may be conducted at a temperature within the range of about 0° to about 100° C. It is preferred to conduct the reaction at about room temperature or within the range of about 20° to about 35° C. The reaction is accelerated by light in the visible spectrum and perhaps also in the near ultraviolet spectrum. When a thiophenoxide is used, there is essentially no reaction in the absence of light. I also prefer to conduct the reaction in an inert atmosphere such as nitrogen.

The olefins obtained by my process are those having the formula

wherein $R^1$, $R^2$, $R^3$ and $R^4$ have the values defined above.

My process will be further illustrated by the following examples. While the preparation of the starting vicinal dinitro compound is not a part of the present invention, the preparation of the starting material will be illustrated.

EXAMPLE 1

Lithium methoxide, prepared by dissolving 0.69 gm. of lithium in 100 ml. of methanol, was treated under nitrogen with 12.6 gm. of nitrocyclohexane. After removal of the methanol, the lithium salt of nitrocyclohexane was dissolved in 50 ml. of water, cooled and treated with 15.98 gm. of bromine. The resulting oil was taken up in pentane, the solution washed with water, dried and the pentane removed. The α-nitrocyclohexyl bromide in 50 ml. of dimethylsulfoxide was added to 14.6 gm. of the lithium salt of nitrocyclohexane suspended in 150 ml. of dimethylsulfoxide and the mixture maintained under nitrogen at 20 to 25° C. for two hours. On pouring into water and recrystallizing from acetone, there was obtained 22.25 gm. of the vicinal dinitro compound 1,1'-dinitrocyclohexyl, melting point 216–217° C.

EXAMPLE 2

Under nitrogen, a stirred mixture of 15.44 gm. of the vicinal dinitro compound prepared in Example 1 and 36 gm. of sodium sulfide nonahydrate in 250 ml. of dimethylformamide was exposed to two 20-watt fluorescent lights for 12 hours at room temperature. The reaction mixture was poured into water, extracted with pentane, the pentane extract washed with water, dried over anhydrous magnesium sulfate and the pentane carefully removed to yield 9.10 gm. of bicyclohexylidene of structure III with a melting point of 53–54° C. On sublimation, there was obtained 8.84 gm. of pure III having a melting point of 53.5–54.5° C.

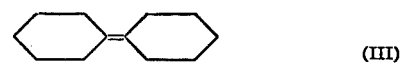

In a similar manner, additional olefins were prepared. Such compounds are listed in Table I, together with the yields obtained.

TABLE I.—OLEFINS SYNTHESIZED FROM VICINAL DINITRO COMPOUNDS

| Example number | Olefin | Percent yield |
|---|---|---|
| 3 | $H_3CCH_2\underset{CH_3}{C}=\underset{CH_3}{C}CH_2CH_3$ | 82 |
| 4 | $CH_3(CH_2)_4C=C(CH_3)_2$<br>$\quad\quad\quad\quad\quad\ \ |$<br>$\quad\quad\quad\quad\quad CH_2CH_2CH_3$ | 88 |
| 5 | $H_5C_6\underset{CH_3}{C}=\underset{CH_3}{C}C_6H_5$ | 82 |
| 6 | 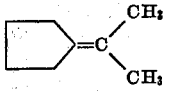 | 89 |
| 7 | 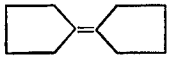 | 92 |
| 8 | 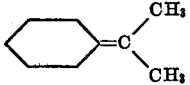 | 90 |
| 9 | 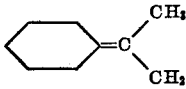 | 91 |
| 10 | 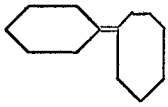 | 84 |

I claim:

1. A method for the preparation of an olefin having the formula

wherein each of $R^1$, $R^2$, $R^3$ and $R^4$ independently is $C_1$–$C_8$ alkyl or phenyl, or $R^1$ and $R^2$ together with the carbon atom to which they are attached or $R^3$ and $R^4$ together with the carbon atom to which they are attached form a $C_4$–$C_8$ cycloalkyl group, which comprises treating a vicinal dinitro compound of the formula

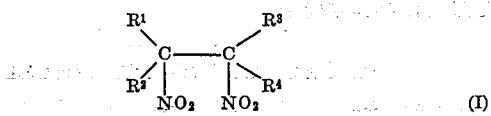

wherein $R^1$, $R^2$, $R^3$ and $R^4$ have the values assigned above with from 1 to 3 moles of a catalyst selected from the group consisting of sodium sulfide, potassium sulfide, lithium sulfide, ammonium sulfide, sodium thiophenoxide, potassium thiophenoxide or lithium thiophenoxide at 0° to 100° C. in an aprotic solvent.

2. A method as in claim 1 wherein the vicinal dinitro compound is treated with from 1 to 3 moles of sodium sulfide.

3. A method as in claim 1 wherein the temperature is within the range of 20° to 35° C.

4. A method as in claim 3 wherein the vicinal dinitro compound is treated with from 1.5 to 2.5 moles of sodium sulfide.

References Cited

Seigle et al., J. Org. Chem. 5, 100 (1940).
Pagano et al., J. Org. Chem. 35, 295 (1970).

DELBERT E. GANTZ, Primary Examiner

J. M. NELSON, Assistant Examiner

U.S. Cl. X.R.

204—158 R